United States Patent [19]

Adams et al.

[11] Patent Number: 4,626,998

[45] Date of Patent: Dec. 2, 1986

[54] HEADING REFERENCE TRIM SYSTEM

[75] Inventors: Don L. Adams, Fairfield; Stuart C. Wright, Milford; William C. Fischer, Monroe; David J. Verzella, Guilford, all of Conn.

[73] Assignee: United Technologies Corporation, Hartford, Conn.

[21] Appl. No.: 490,646

[22] Filed: May 2, 1983

[51] Int. Cl.[4] .............................................. B64C 13/08
[52] U.S. Cl. .................................... 364/434; 244/178; 318/585; 318/586
[58] Field of Search ............... 364/424, 432, 433, 434; 244/178, 180–184, 17.13; 318/584–586

[56] References Cited

U.S. PATENT DOCUMENTS

| 3,711,042 | 1/1973 | Rempfer et al. | 244/17.13 |
| 3,848,172 | 11/1974 | Thomas | 318/586 |
| 4,003,532 | 1/1977 | Adams et al. | 244/17.13 |
| 4,067,517 | 1/1978 | Barnum | 244/17.13 |
| 4,213,584 | 7/1980 | Tefft et al. | 244/17.13 |
| 4,330,829 | 5/1982 | Fischer et al. | 244/17.13 |

Primary Examiner—Errol A. Krass
Assistant Examiner—Thomas G. Black
Attorney, Agent, or Firm—Gerald E. Linden

[57] ABSTRACT

A heading trim reference system provides beep commands indicative of a desired heading/attitude change to the roll channel of an AFCS as roll commands at slow speed in a conventional manner, and to the yaw channel as yaw commands at cruise speed. At cruise speed, the yaw synchronizing integrator responds to the beep commands and provides an error signal to existing turn coordination logic to turn the aircraft.

3 Claims, 1 Drawing Figure

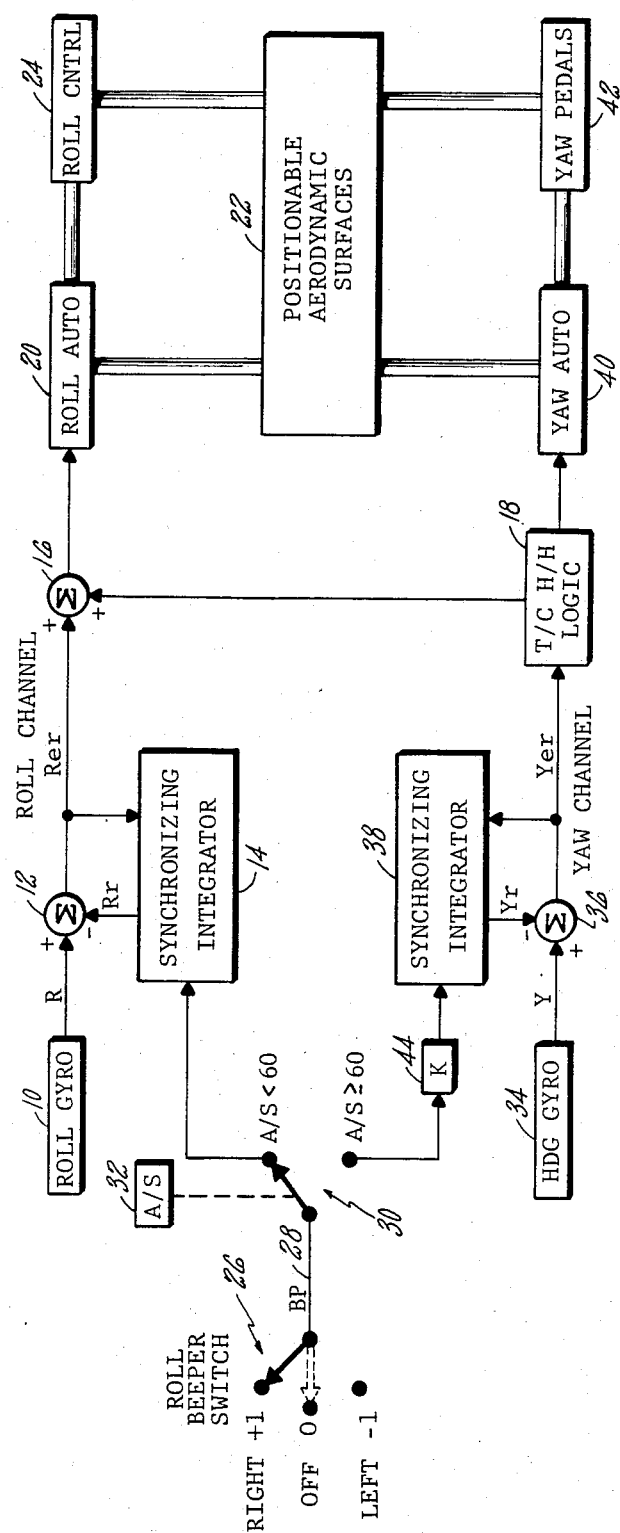

HEADING REFERENCE TRIM SYSTEM

1. Technical Field

This invention relates to aircraft automatic flight control systems and more particularly to effectuating heading changes

2. Background Art

A heading reference trim system applicable to helicopters is disclosed herein, but the teachings have relevance to fixed-wing aircraft.

Helicopters are maneuvered by the manipulation of various flight controls (a cyclic stick, a collective stick, and yaw pedals) that affect the main rotor blade cyclic and collective pitch and the tail rotor blade collective pitch. The pitch of the main and tail rotors may also be affected by an automatic flight control system (AFCS). An outer-loop AFCS controls flight characteristics by acting upon and through the flight controls. Therefore the operation of an outer-loop AFCS is manifested to the pilot by motions of the sticks and pedals. An inner-loop AFCS controls flight characteristics by acting directly on the rotors, bypassing the manual flight controls. Inner-loop commands are combined with manual or outer-loop commands, but the operation of the inner-loop is not manifested to the pilot, except in increased aircraft stability.

Among other functions, an AFCS operates to maintain the heading and attitude of a helicopter. Typically, a desired heading and/or attitude is achieved by manual control and then the autopilot is engaged. A synchronizing integrator in the particular AFCS channel locks onto an attitude or heading signal from a gyro to provide a reference signal, indicative of the attitude or heading signal at the moment that the particular channel is turned on. Heading and attitude are then maintained based on error signals indicative of the difference between the reference signal and the current gyro output.

For implementing roll attitude changes it is known to provide a beeper switch on the cyclic control. Beeper switches operate in association with the AFCS to acquire new flight attitudes, without manual movement of the flight control. For example, a pilot, desiring to acquire a new heading by turning (rolling) the helicopter, depresses the beeper switch for a limited time to initiate a turn. During the limited time, a command signal is integrated by the synchronizing integrator to affect the reference signal, thereby losing the pre-maneuver wings-level reference, and providing a non-ZERO roll error signal as an input to the roll autopilot. As a new attitude is acquired, the error signal becomes ZERO, and the roll channel maintains the desired new reference attitude. Since the response of the aircraft generally lags the error signal, some pilot anticipation is required to beep to a new attitude. In order to restore the pre-maneuver attitude (e.g., wings-level), the pilot must either beep in the opposite direction for a like limited time or release trim, maneuver to the original attitude, and engage trim. Either alternative requires a high pilot workload. It is not only known, but also desirable to correlate roll error signals with yaw channel commands to coordinate turns. However, in this mode, wings-level reference is lost. Loss of wings-level reference may not be desirable for IFR flight-regime requirements due to the possibility of pilot vertigo.

It is also known to provide a yaw trim knob in the yaw channel for commanding small heading changes. Turning the yaw trim knob trims the yaw signal to generate an error signal in the yaw channel. This is only suitable for small or sub-cruise speed changes, since providing only yaw commands at cruise speeds results in uncoordinated turns. The yaw trim knob usually is located on the AFCS control panel. When the pilot operates the yaw trim knob, his attention to visual and IFR cues is interrupted.

In a commonly owned copending U.S. Pat. application No. 470,367, filed Feb. 28, 1983, entitled "Heading Acquisition System", a system is disclosed whereby a single switch provides command signals to the roll and yaw channels of an AFCS. Generally, yaw commands are provided at slow speed and roll commands are provided at cruise speed.

DISCLOSURE OF INVENTION

Therefore, it is an object of this invention to provide for pilot commanded heading changes, through an AFCS, without losing wings-level reference, while maintaining 100% pilot attention to the flight controls and instruments, thereby reducing the possibility of pilot vertigo. It is a further object to implement this invention using existing pilot controls, without the need for an additional switch, or the like.

Accordingly, the heading trim reference system of this invention provides beep commands from a roll beeper switch to the yaw channel as yaw commands at cruise speeds (e.g., at least 60 knots). The yaw synchronizing integrator responds to the yaw commands and provides an error signal to existing turn coordination logic to turn the aircraft. At slow speeds, the beep commands are provided to the roll channel as roll commands in a conventional manner. A switch automatically transfers the beep commands from roll to yaw in response to an airspeed signal.

Other objects, features and advantages of the present invention will become more apparent in the light of the following detailed description of an exemplary embodiment thereof.

BRIEF DESCRIPTION OF DRAWINGS

The sole FIGURE is a schematic block diagram of the heading reference trim system of this invention in association with existing autopilot channels and functions.

BEST MODE FOR CARRYING OUT THE INVENTION

In the sole FIGURE is shown the heading reference trim system of this invention as practiced with an AFCS having yaw and roll channels.

A roll gyro 10 provides a roll attitude signal (R) to a summer 12. The summer 12 provides a roll error signal (Rer) as the difference of the roll attitude signal (R) and a roll reference signal (Rr). The roll reference signal (Rr) is synchronized to the roll error signal (Rer) by a synchronizing integrator 14 when the roll channel is off (sync). When the roll channel is turned on, the roll reference (Rr) is provided and a roll autopilot 20 zeroes the roll error signal. As the aircraft is perturbed, the roll error signal (Rer) varies and is biased at a summer 16 by a signal from existing turn-coordination/heading-hold logic 18, as discussed hereinafter. The roll autopilot 20 responds to the biased roll error signal to affect the positions of positionable aerodynamic surfaces 22, such as a helicopter main rotor, either directly, or through the pilot's roll control 24 which is also operable to affect their positions.

A roll beeper switch 26 is located on the pilot's cyclic stick so as to be manipulated easily by the pilot (e.g., by the pilot's thumb) without a necessity for the pilot to relinquish his grip on the cyclic stick. The beeper switch 26 is spring-loaded, center off, and provides a beep command (BP), on a line 28 to a switch 30, indicative of a desired flight attitude/heading change. The beeper switch 26 may be the roll mode of a four-way roll/pitch "coolie hat" beeper switch that is commonly used. Manipulation of the beeper switch 26 to the right provides a signal, such as logic ONE, indicative of a desired right roll on the line 28 and manipulation to the left provides a signal, such as a logic MINUS ONE, indicative of a desired left roll. In the off position, the beeper switch 26 provides no signal on the line 28.

An airspeed sensor 32 provides a cruise speed signal to the switch 30 indicative of an airspeed of at least sixty knots as a nominal indication of cruise speed. When the cruise speed signal is not provided (i.e., airspeed below sixty knots) the switch 30 provides the beep command (BP) as a roll command to the roll synchronizing integrator 14. With appropriate internal gains, the roll command biases the reference signal (Rr) to affect the error signal (Rer) and consequently affect the roll attitude. Of course, wings level reference (i.e., pre-maneuver reference) is lost through this procedure. The function of the roll beeper in affecting roll attitude is known in the art.

When the aircraft is flying at least at cruise speed, the cruise speed signal is provided and causes the switch 30 to provide the beep command (BP) as a yaw command to the yaw channel.

The yaw channel operates analogously to the roll channel insofar that a heading gyro 34 provides a heading signal (Y) to a summer 36 and to a synchronizing integrator 38 to provide a yaw error signal (Yer), as the difference of a yaw reference signal (Yr) and the heading signal (Y). At slow speeds (less than 60 knots) the error signal (Yer) is provided by the existing turn-coordination/heading-hold logic 18 to a yaw autopilot 40 which affects the positions of the positionable aerodynamic surfaces 22 either directly, or through the pilot's yaw pedals 42. At cruise speeds, when certain conditions, such as feet-off-pedals, are satisfied the yaw error signal (Yer) is provided to the summer 16 to bias the roll error signal (Rer), thereby establishing roll based on heading error (Yer) to initiate the turn with turn coordination being accomplished via the yaw axis. Yaw-only maneuvers at cruise speed cause undesirable aircraft loading.

The beep command (BP), when provided as the yaw command to the yaw channel, is converted to yaw rate by an amplifier 44 having a gain K. The output of the amplifier 44 is provided to the synchronizing integrator 38 and integrated (ramp up or down) thereby trimming the yaw reference signal (Yr) to provide a non-ZERO error signal (Yer) to the T/C H/H logic 18. Thereby, heading changes are implemented through the yaw channel at cruise speeds by manipulation of the roll beeper switch 26, with turn coordination and without loss of wings-level reference. Since the beep signal (BP) is ultimately integrated in the integrator 38 to cause a heading change, some estimation of the duration of beep switch 26 manipulation and anticipation of a new heading is required to acquire a new heading trim reference, and repeated, short-duration manipulations of the switch 26 may be required to achieve a precise heading.

The embodiment herein is described principally in terms of function-achieving blocks. It should be understood that a variety of modes and methods which are fully equivalent to those disclosed herein may be utilized, the choice of which is dictated by apparatus found on a particular aircraft. In fact, the best mode of practicing the invention may be in a digital AFCS. The conversion of the discrete and analog functions described herein to digital functions performed by suitable software is well within the skill in the art, particularly in the light of the teachings of equivalency set forth in a commonly owned copending U.S. application Ser. No. 176,832, filed on Aug. 8, 1980 by Clelford, et. al, now U.S. Pat No. 4,382,283.

The invention may be practiced in automatic flight control systems having single channels of inner loop or outer loop, dual channels of inner loop or of outer loop, or more channels of either, in various combinations, or with dual (pilot/co-pilot) controls. The exemplary conditions, magnitudes, and relationships may of course be varied to suit any usage of the invention. Aspects of the invention may be practiced in automatic control of various functions, in addition to the illustrative functions described herein.

Although the invention has been shown and described with respect to an exemplary embodiment thereof, it should be understood by those skilled in the art that the foregoing and various other changes, omissions and additions may be made therein and thereto, without departing from the spirit and scope of the invention.

What is claimed is:

1. A heading reference trim system for an aircraft automatic flight control system having a roll channel for automatically controlling roll attitude and a yaw channel for automatically controlling yaw attitude, comprising:
   a beeper switch for providing a heading change signal indicative of a desired change in heading;
   airspeed sensing means for providing a cruise speed signal indicative of at least a threshold airspeed;
   switch means for providing the heading change signal in the roll channel to effect a change in roll attitude when the cruise speed signal is not present, and for providing the heading change signal in the yaw channel to effect a change in yaw attitude when the cruise speed signal is present so that a roll attitude reference in the roll channel remains unaffected by heading changes which are made by the beeper switch at cruise speeds.

2. Apparatus according to claim 1 further comprising turn coordination means for coupling heading change signals from the yaw channel to the roll channel so that both yaw attitude and roll attitude are changed at cruise speeds without affecting the roll attitude reference in the roll channel.

3. Apparatus according to claim 1 wherein the heading change signal is provided as a yaw rate signal to an integrator in the yaw channel.

* * * * *